US012364971B1

(12) United States Patent
Ahmed et al.

(10) Patent No.: US 12,364,971 B1
(45) Date of Patent: Jul. 22, 2025

(54) NiTiO$_3$/TiO$_2$/Ti$_{0.936}$O$_2$/Zn$_2$Ti$_3$O$_8$/C NANOCOMPOSITE AND METHOD OF PREPARATION USING SOL-GEL/COMBUSTION (71) Applicant: IMAM MOHAMMAD IBN SAUD ISLAMIC UNIVERSITY, Riyadh (SA)

(72) Inventors: Ehab Abdelhamed Abdelrahman Ahmed, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/175,498

(22) Filed: Apr. 10, 2025

(51) Int. Cl.
| | | |
|---|---|---|
| *B01J 21/00* | (2006.01) | |
| *B01J 21/06* | (2006.01) | |
| *B01J 35/39* | (2024.01) | |
| *B01J 35/45* | (2024.01) | |
| *B01J 35/77* | (2024.01) | |
| *B01J 37/08* | (2006.01) | |
| *B01J 37/12* | (2006.01) | |
| *C02F 1/30* | (2023.01) | |
| *C02F 101/30* | (2006.01) | |

(52) U.S. Cl.
CPC ............ *B01J 21/063* (2013.01); *B01J 35/39* (2024.01); *B01J 35/45* (2024.01); *B01J 35/77* (2024.01); *B01J 37/088* (2013.01); *B01J 37/12* (2013.01); *C02F 1/30* (2013.01); *B01J 2235/15* (2024.01); *B01J 2235/30* (2024.01); *C02F 2101/30* (2013.01)

(58) Field of Classification Search
None
See application file for complete search history.

(56) References Cited

FOREIGN PATENT DOCUMENTS

| CN | 110407260 A | 11/2019 |
|---|---|---|
| CN | 108511730 B | 11/2020 |
| CN | 110280248 B | 3/2022 |

OTHER PUBLICATIONS

Lei Wang, et al., "Pomegranate-inspired Zn2Ti3O8/TiO2@C nanospheres with pseudocapacitive effect for ultra-stable lithium-ion batteries", Chemical Engineering Journal, vol. 418, Aug. 15, 2021(8 pages).

Alberto Bacilio Quispe Cohaila, et al., "Improving photocatalytic hydrogen production with sol-gel prepared NiTiO$_3$/TiO$_2$ composite", Energies 2024, vol. 17, Issue 23, 2024 (17 pages).

(Continued)

*Primary Examiner* — Stefanie J Cohen
(74) *Attorney, Agent, or Firm* — Oblon, McClelland, Maier & Neustadt, L.L.P.

(57) ABSTRACT

A nanocomposite and a method of its preparation. The nanocomposite includes a nickel titanate, titanium dioxide including anatase TiO$_2$ and rutile Ti$_{0.936}$O$_2$, a zinc titanate, and carbon. The nanocomposite includes 20 atom percentage (%) to 40 atom % titanium, 5 to 15 atom %, and 5 atom % to 15 atom % zinc, each based on a total number of atoms in the nanocomposite. The nanocomposite is used in a method of photodegrading an organic pollutant.

20 Claims, 5 Drawing Sheets (56) References Cited

OTHER PUBLICATIONS

Hossein Khojasteh, et al., "Synthesis, characterization and photocatalytic properties of nickel-doped TiO2 and nickel titanate nanoparticles", J Mater Sci: Mater Electron, vol. 27, 2016, pp. 3599-3607 (9 pages).
Cheng-Li Wang, et al., "Phase transformation and microstructure of Zn2Ti3O8 nanocrystallits powders prepared using the hydrothermal process", Metallurgical and Materials Transactions A, vol. 45, Jan. 2014, pp. 250-260 (11 pages).

$NiTiO_3/TiO_2/Ti_{0.936}O_2/Zn_2Ti_3O_8/C$ NANOCOMPOSITE AND METHOD OF PREPARATION USING SOL-GEL/COMBUSTION

BACKGROUND

Technical Field

The present disclosure is directed towards a $NiTiO_3/TiO_2/Ti_{0.936}O_2/Zn_2Ti_3O_8/C$ nanocomposite and its preparation using a sol-gel/combustion method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Nanocomposites are multiphase solid materials where one of the phases has one, two or three dimensions of less than 1000 nanometers (nm) or structures having nano-scale repeat distances between the different phases that make up the material.

Current technologies often fail to produce materials that integrate multiple crystalline phases with precise structural and compositional control, leading to limitations in functionality and performance. The limitation arises because the processes required to manipulate multiple phases at microscopic and nanoscopic scales are complex and difficult to control. The lack of fine-tuned control over phase integration hinders the development of advanced materials with desired multifunctional properties, such as high strength, thermal stability, or electrical conductivity. As a result, materials may not perform optimally in applications requiring precise functionality or durability, limiting its potential in industries like electronics, aerospace, and energy storage. Advances in fabrication techniques, such as nanostructuring, are crucial to overcoming the challenges and unlocking the full potential of such materials.

Previous research has extensively explored the synthesis and applications of individual components such as nickel titanate ($NiTiO_3$), titanium dioxide ($TiO_2$), and other titanate-based nanomaterials, each offering unique properties like photocatalytic activity, structural stability, and environmental remediation potential. However, the studies often focus on single-phase materials or binary composites, which limit its multifunctionality and application scope. The inclusion of tertiary, quaternary, and more materials can impart new and/or improved properties and functionality to nanocomposites. Unfortunately, such complex nanocomposites are difficult to prepare. The synthetic procedures can be unpredictable and difficult to control.

Accordingly, it is one objective of the present disclosure to provide a synthesis method and system that may circumvent the drawbacks, such as, complexity, high cost, lack of multiphase integration and nanoscale precision, of the materials known in the art.

SUMMARY

According to a first aspect, the present application is directed to a nanocomposite. In some embodiments, the nanocomposite includes a nickel titanate, titanium dioxide including anatase $TiO_2$ and rutile $Ti_{0.936}O_2$, a zinc titanate, and carbon. In some embodiments, the nanocomposite includes 20 atom percentage (%) to 40 atom % titanium, 5 atom % to 15 atom % nickel, and 5 atom % to 15 atom % zinc, each based on a total number of atoms in the nanocomposite.

In some embodiments, the nickel titanate is rhombohedral $NiTiO_3$.

In some embodiments, the zinc titanate is cubic $Zn_2Ti_3O_8$.

In some embodiments, the carbon is present as a carbon nanomaterial which is at least one selected from the group including carbon nanotubes, carbon nanobuds, carbon nanoscrolls, carbon dots, activated carbon, carbon black, graphene, graphene oxide, reduced graphene oxide, and nanodiamonds.

In some embodiments, the nanocomposite includes 40 60 atom % to 60 atom % oxygen, and 4 60 atom % to 12 atom % carbon, each based on a total number of atoms in the nanocomposite.

In some embodiments, the nanocomposite has a mean particle size of 25 nanometer (nm) to 75 nm by transmission electron microscope (TEM) and a mean crystallite size of 30 nm to 85 nm by X-ray diffraction (XRD), the mean crystallite size being larger than the mean particle size.

The present application is also directed to a method of forming the nanocomposite. In some embodiments, the method includes mixing a first solution including a titanium alkoxide, an alcohol having 1 to 5 carbon atoms, and an organic acid with a second solution including a zinc ion source and a nickel ion source to form a metal precursor solution. In some embodiments, the method includes adding a third solution including an amino acid to the metal precursor solution to form a reaction mixture. In some embodiments, the method includes heating the reaction mixture to 100° C. to 200° C. until dry to form an intermediate product. In some embodiments, the method includes calcining the intermediate product at 600° C. to 800° C. to form the nanocomposite.

In some embodiments, the titanium alkoxide is titanium butoxide.

In some embodiments, the alcohol having 1 to 5 carbon atoms is ethanol.

In some embodiments, the organic acid is glacial acetic acid.

In some embodiments, the zinc ion source is zinc nitrate.

In some embodiments, the nickel ion source is nickel nitrate.

In some embodiments, the amino acid is arginine.

In some embodiments, the second solution has a mole ratio of zinc to nickel of 1.5:1 to 1:1.5.

In some embodiments, the metal precursor solution has a mole ratio of titanium to a sum of a zinc and nickel of 1.75:1 to 0.75:1.

In some embodiments, the amino acid is present in an amount of 5 gram per liter (g/L) to 10 g/L based on a total volume of reaction mixture.

The present application is also directed to a method of photodegrading an organic pollutant. In some embodiments, the method includes irradiating with light a photodegradation mixture including the organic pollutant, water, and the nanocomposite. In some embodiments, the organic pollutant is at least one selected from the group including a dye, a phenol, a polycyclic aromatic hydrocarbon, an herbicide, a pesticide, and a persistent organic pollutant.

In some embodiments, the photocatalyst is present in the photodegradation mixture in an amount of 10 mg to 5000 mg photocatalyst per liter (L) of photodegradation mixture.

In some embodiments, the organic pollutant is present in the photodegradation mixture in an amount of 0.01 per parts million (ppm) to 10,000 ppm.

In some embodiments, the method degrades 70% to 99% of an initial amount of organic pollutant in a reaction time of 180 minutes.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'amount' refers to the level or concentration of one or more reactants, catalysts, or materials present in a reaction mixture.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nm.

As used herein, the term 'calcination' refers to heating a compound to a high temperature, under a restricted supply of ambient oxygen. This is performed to remove impurities or volatile substances and to incur thermal decomposition.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, 'sol-gel/combustion' refers to a combined synthesis method that utilizes both the sol-gel process and combustion techniques. In the sol-gel process, precursor chemicals are converted into a gel-like network, which is then subjected to combustion to facilitate the formation of nanostructured materials. This hybrid approach enables the efficient production of high-performance nanocomposites with controlled properties for various applications.

As used herein, 'anatase $TiO_2$' refers to a specific crystalline form of titanium dioxide ($TiO_2$) that exhibits distinct structural and electronic properties compared to other polymorphs like rutile and brookite. Anatase TiO2 crystallizes in the $I4_1/amd$ space group. Anatase $TiO_2$ is known for its high photocatalytic activity and is widely used in applications such as photocatalysis, solar cells, and environmental remediation due to its unique surface properties and high surface area.

As used herein, 'rutile $TiO_2$' refers to a crystalline form of titanium dioxide ($TiO_2$), characterized by its tetragonal crystal structure that crystallizes in the $P4_2/mnm$ space group. Rutile $TiO_2$ is known for its excellent optical properties, high refractive index, and durability. It is frequently used in applications such as pigments, coatings, and as a photocatalyst in certain chemical reactions due to its strong photocatalytic stability and efficiency.

As used herein, the term 'crystallite' refers to a tiny or even microscopic crystal which is formed during the cooling of many materials.

As used herein, the term 'titanates' refers to compounds comprising titanium (Ti) and oxygen (O), including but not limited to metal titanates such as those having formulas of $MTiO_3$, $M_2TiO_4$, $M_2TiO_3$, $M_2Ti_2O_7$, and $M_4Ti_3O_{12}$ where M is a metal, and other titanium-based compounds, where the titanium is chemically bonded to oxygen and/or other elements. This includes, for example, metal titanates such as barium titanate ($BaTiO_3$), strontium titanate ($SrTiO_3$), calcium titanate ($CaTiO_3$), and other related compounds, in any form including crystalline, amorphous, or composite materials.

As used herein, the term 'photodegradation' refers to the process by which a material undergoes chemical breakdown or alteration due to exposure to light. This process typically results in the breaking of molecular bonds within the material, leading to the formation of new compounds or the degradation of its physical and chemical properties.

Aspects of the present disclosure are directed to a $NiTiO_3/TiO_2/Ti_{0.936}O_2/Zn_2Ti_3O_8/C$ nanocomposite or a nanocomposite fabricated using a facile sol-gel/combustion approach. The nanocomposite of the present disclosure may be useful in applications such as environmental remediation, energy storage, and catalysis, all while ensuring scalability and sustainability.

According to a first aspect, the present disclosure relates to a nanocomposite. In some embodiments, the nanocomposite includes nickel titanate ($NiTiO_3$); titanium dioxide including anatase $TiO_2$ and rutile $Ti_{0.936}O_2$; zinc titanate ($ZnTiO_3$); and carbon. In some embodiments, other metal titanates, apart from nickel titanate, such as, but not limited to, barium titanate ($BaTiO_3$), strontium titanate ($SrTiO_3$), lead titanate ($PbTiO_3$), magnesium titanate ($MgTiO_3$), calcium titanate ($CaTiO_3$), may also be used. Such other titanates may be present in addition to the nickel titanate and/or zinc titanate.

In general, the nickel titanate may adopt any suitable structure. For example, the nickel titanate may be cubic, tetragonal, rhombohedral, hexagonal, or orthorhombic. In some embodiments, the nickel titanate is rhombohedral $NiTiO_3$. In general, the zinc titanate may adopt any suitable structure. For example, the zinc titanate may be cubic, tetragonal, rhombohedral, hexagonal, or orthorhombic. In some embodiments, the zinc titanate is cubic $Zn_2Ti_3O_8$.

In some embodiments, the nanocomposite includes 20 to 40 atom % titanium, based on a total number of atoms in the nanocomposite. For example, the nanocomposite may include 20.0 atom %, 20.5 atom %, 21.0 atom %, 21.5 atom %, 22.0 atom %, 22.5 atom %, 23.0 atom %, 23.5 atom %, 24.0 atom %, 24.5 atom %, 25.0 atom %, 25.5 atom %, 26.0 atom %, 26.5 atom %, 27.0 atom %, 27.5 atom %, 28.0 atom %, 28.5 atom %, 29.0 atom %, 29.5 atom %, 30.0 atom %, 30.5 atom %, 31.0 atom %, 31.5 atom %, 32.0 atom %, 32.5 atom %, 33.0 atom %, 33.5 atom %, 34.0 atom %, 34.5 atom %, 35.0 atom %, 35.5 atom %, 36.0 atom %, 36.5 atom %, 37.0 atom %, 37.5 atom %, 38.0 atom %, 38.5 atom %, 39.0 atom %, 39.5 atom %, or 40.0 atom % titanium, based on a total number of atoms in the nanocomposite. In some embodiments, the nanocomposite comprises 24.3 atom % titanium, based on a total number of atoms in the nanocomposite.

In some embodiments, the nanocomposite includes 5 to 15 atom % nickel, based on a total number of atoms in the nanocomposite. For example, the nanocomposite may include 5.0 atom %, 5.25 atom %, 5.5 atom %, 5.75 atom %, 6.0 atom %, 6.25 atom %, 6.5 atom %, 6.75 atom %, 7.0 atom %, 7.25 atom %, 7.5 atom %, 7.75 atom %, 8.0 atom %, 8.25 atom %, 8.5 atom %, 8.75 atom %, 9.0 atom %, 9.25 atom %, 9.5 atom %, 9.75 atom %, 10.0 atom %, 10.25 atom %, 10.5 atom %, 10.75 atom %, 11.0 atom %, 11.25 atom %, 11.5 atom %, 11.75 atom %, 12.0 atom %, 12.25 atom %, 12.5 atom %, 12.75 atom %, 13.0 atom %, 13.25 atom %, 13.5 atom %, 13.75 atom %, 14.0 atom %, 14.25 atom %, 14.5 atom %, 14.75 atom %, or 15.0 atom % nickel, based on a total number of atoms in the nanocomposite. In some embodiments, the nanocomposite comprises 8.9 atom % nickel, based on a total number of atoms in the nanocomposite.

In some embodiments, the nanocomposite includes 5 to 15 atom % zinc, based on a total number of atoms in the nanocomposite. For example, the nanocomposite may include 5.0 atom %, 5.25 atom %, 5.5 atom %, 5.75 atom %, 6.0 atom %, 6.25 atom %, 6.5 atom %, 6.75 atom %, 7.0 atom %, 7.25 atom %, 7.5 atom %, 7.75 atom %, 8.0 atom %, 8.25 atom %, 8.5 atom %, 8.75 atom %, 9.0 atom %, 9.25 atom %, 9.5 atom %, 9.75 atom %, 10.0 atom %, 10.25 atom %, 10.5 atom %, 10.75 atom %, 11.0 atom %, 11.25 atom %, 11.5 atom %, 11.75 atom %, 12.0 atom %, 12.25 atom %, 12.5 atom %, 12.75 atom %, 13.0 atom %, 13.25 atom %, 13.5 atom %, 13.75 atom %, 14.0 atom %, 14.25 atom %, 14.5 atom %, 14.75 atom %, or 15.0 atom % zinc, based on a total number of atoms in the nanocomposite. In some embodiments, the nanocomposite comprises 8.9 atom % zinc, based on a total number of atoms in the nanocomposite.

In some embodiments, the nanocomposite comprises 40 to 60 atom % oxygen, based on a total number of atoms in the nanocomposite. For example, the nanocomposite may include 40.0 atom %, 40.5 atom %, 41.0 atom %, 41.5 atom %, 42.0 atom %, 42.5 atom %, 43.0 atom %, 43.5 atom %, 44.0 atom %, 44.5 atom %, 45.0 atom %, 45.5 atom %, 46.0 atom %, 46.5 atom %, 47.0 atom %, 47.5 atom %, 48.0 atom %, 48.5 atom %, 49.0 atom %, 49.5 atom %, 50.0 atom %, 50.5 atom %, 51.0 atom %, 51.5 atom %, 52.0 atom %, 52.5 atom %, 53.0 atom %, 53.5 atom %, 54.0 atom %, 54.5 atom %, 55.0 atom %, 55.5 atom %, 56.0 atom %, 56.5 atom %, 57.0 atom %, 57.5 atom %, 58.0 atom %, 58.5 atom %, 59.0 atom %, 59.5 atom %, or 60 atom % oxygen, based on a total number of atoms in the nanocomposite. In some embodiments, the nanocomposite comprises 49.9 atom % oxygen, based on a total number of atoms in the nanocomposite.

In some embodiments, the nanocomposite comprises 4 to 12 atom % carbon, based on a total number of atoms in the nanocomposite. For example, the nanocomposite can include 4.0 atom %, 4.25 atom %, 4.5 atom %, 4.75 atom %, 5.0 atom %, 5.25 atom %, 5.5 atom %, 5.75 atom %, 6.0 atom %, 6.25 atom %, 6.5 atom %, 6.75 atom %, 7.0 atom %, 7.25 atom %, 7.5 atom %, 7.75 atom %, 8.0 atom %, 8.25 atom %, 8.5 atom %, 8.75 atom %, 9.0 atom %, 9.25 atom %, 9.5 atom %, 9.75 atom %, 10.0 atom %, 10.25 atom %, 10.5 atom %, 10.75 atom %, 11.0 atom %, 11.25 atom %, 11.5 atom %, 11.75 atom %, or 12.0 atom % carbon, based on a total number of atoms in the nanocomposite. In some embodiments, the nanocomposite comprises 8.0 atom % carbon, based on a total number of atoms in the nanocomposite.

In some embodiments, the nanocomposite comprises 49.9 atom % oxygen, 24.3 atom % titanium, 8.9 atom % nickel, 8.9 atom % zinc, and 8.0 atom % carbon.

In some embodiments, the carbon is present isolated atoms or ions, clusters of atoms or ions, and/or present as complexes or groups comprising carbon. Such complexes or groups comprising carbon can be, for example, organic molecules incorporated into or present on a surface of the nanocomposite. In some embodiments, the carbon is present as interstitial dopant atoms in another material, such as the nickel titanate, titanium dioxide, and/or zinc titanate. In some embodiments, the carbon is present in the nanocomposite in the form of a carbon nanomaterial.

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon is present as a carbon nanomaterial which is at least one selected from carbon nanotubes, carbon nanobuds, carbon nanoscrolls, carbon dots, activated carbon, carbon black, graphene, graphene oxide, reduced graphene oxide, and nanodiamonds.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In some embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In some embodiments, the graphene is functionalized graphene. Functionalized graphene is distinguished from pristine graphene by the presence of functional groups on the surface or edge of the graphene that contain elements other than carbon and hydrogen. In some embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In some embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanoparticles are activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanoparticles are carbon black. Carbon black refers to having a semi-crystalline, semi-graphitic structure and a large surface area. Carbon black may be distinguished from activated carbon by a comparatively lower surface area, typically 15 to 500 $m^2/g$ for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In some embodiments, mixtures of types of particles are used.

In some embodiments, the carbon nanomaterial is present in the form of sheets having a mean thickness of 50 to 500 nm, preferably 60 to 475 nm, preferably 75 to 450 nm, preferably 100 to 425 nm, preferably 110 to 400 nm, preferably 125 to 375 nm, preferably 150 to 350 nm and a mean width of 500 to 5000 nm, preferably 550 to 4750 nm, preferably 600 to 4500 nm, preferably 650 to 4250 nm, preferably 700 to 4000 nm, preferably 750 to 3900 nm, preferably 800 to 3800 nm, preferably 850 to 3700 nm, preferably 900 to 3600 nm, preferably 950 to 3500 nm, preferably 1000 to 3400 nm.

In some embodiments, the sheets have a monodisperse thickness, having a coefficient of variation or relative standard deviation, expressed as a percentage and defined as the ratio of the sheet thickness standard deviation ($\sigma$) to the sheet thickness mean ($\mu$), multiplied by 100%, of less than 25%, preferably less than 10%, preferably less than 8%, preferably less than 6%, preferably less than 5%. In a preferred embodiment, the sheets have a monodisperse thickness, having a size distribution ranging from 80% of the average thickness to 120% of the average thickness, preferably 85 to 115%, preferably 90 to 110% of the average thickness. In another embodiment, the sheets do not have a monodisperse thickness. In some embodiments, the sheets have a monodisperse diameter, having a coefficient of variation or relative standard deviation, expressed as a percentage and defined as the ratio of the sheet diameter standard deviation ($\sigma$) to the sheet diameter mean ($\mu$), multiplied by 100%, of less than 25%, preferably less than 10%, preferably less than 8%, preferably less than 6%, preferably less than 5%. In a preferred embodiment, the sheets have a monodisperse diameter, having a size distribution ranging from 80% of the average diameter to 120% of the average diameter, preferably 85 to 115%, preferably 90 to 110% of the average diameter. In another embodiment, the sheets do not have a monodisperse diameter.

In some embodiments, the nanocomposite has a mean crystallite size of 30 to 85 nm. For example, the nanocomposite may have a mean crystallite size of 30 nm, 32.5 nm 35 nm, 37.5 nm, 40 nm, 42.5 nm 45 nm, 47.5 nm, 50 nm, 52.5 nm, 55 nm, 57.5 nm, 60 nm, 62.5 nm, 65 nm, 67.5 nm, 70 nm, 72.5 nm, 75 nm, 77.5 nm, or 80 nm. The mean crystallize size may be determined by a suitable X-ray diffraction (XRD) technique. In some embodiments, the nanocomposite exhibits an average crystallite size of 61.31 nm.

In some embodiments, the nanocomposite has a mean particle size of 25 to 75 nm. For example, the nanocomposite may have a mean particle size of 25 nm, 27.5 nm, 30 nm, 32.5 nm, 35 nm, 37.5 nm, 40 nm, 42.5 nm, 45 nm, 47.5 nm, 50 nm, 52.5 nm, 55 nm, 57.5 nm, 60 nm, 62.5 nm, 65 nm, 67.5 nm, 70 nm, 72.5 nm, or 75 nm. The mean particle size may be determined by a suitable electron microscopy technique such as transmission electron microscopy (TEM). In some embodiments, the nanocomposite exhibits an average particle diameter of 54.74 nm.

In some embodiments, the mean crystallite size is larger than the mean particle size. This may be due to or associated with the presence of amorphous material. Such amorphous material may be present as separate particles or may be associated with one or more types of particles (e.g., particles of one specific material). This amorphous material may be visible in a suitable electron microscopy technique used to determine particle size and may contribute to the mean particle size determined by that method, but not visible in the XRD technique and therefore not contribute to the mean crystallize size determined by that technique.

Figure 1:
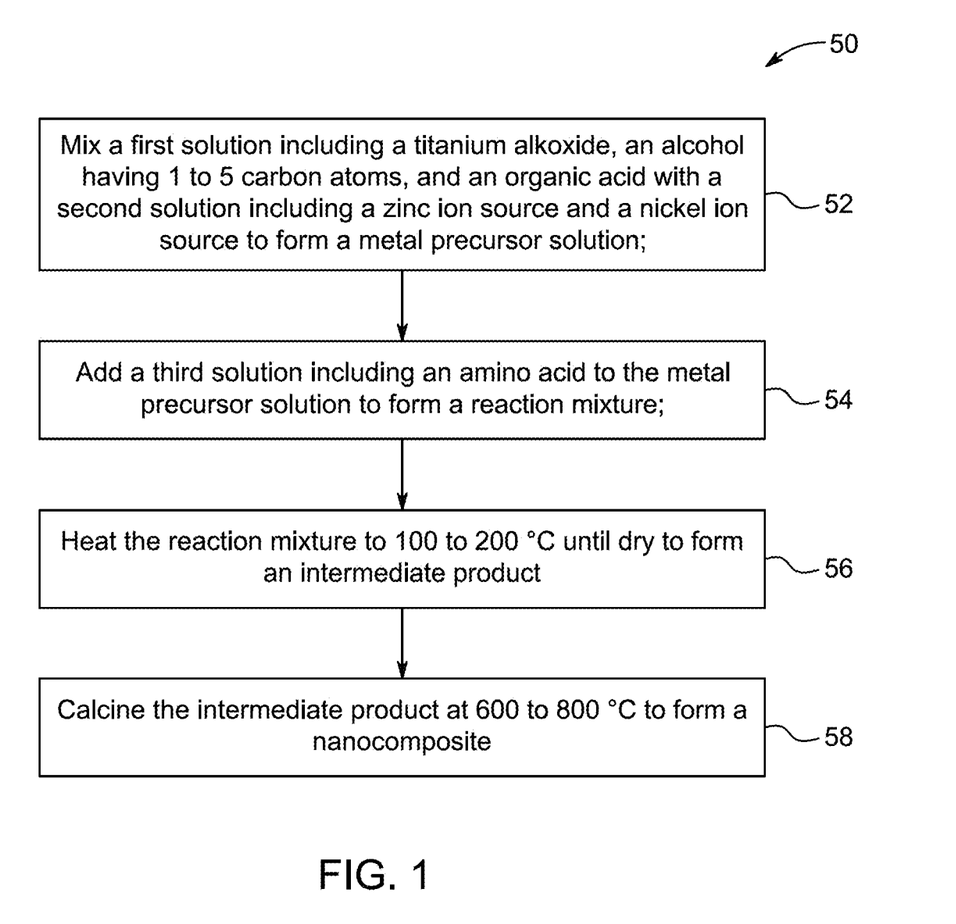
FIG. 1 is a schematic flow chart of a method of forming a nanocomposite, according to certain embodiments.

FIG. 1 illustrates a schematic flow chart of a method 50 of preparing the nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes mixing a first solution including a titanium alkoxide, an alcohol having 1 to 5 carbon atoms, and an organic acid with a second solution including a zinc ion source and a nickel ion source to form a metal precursor solution.

In general, the titanium alkoxide may be any suitable titanium alkoxide known to one of ordinary skill in the art. In general, a titanium alkoxide refers to a titanium compound or coordination complex that includes at least one alkoxide ligand. Preferably, the titanium alkoxide includes at least two alkoxide ligands. Examples of suitable titanium alkoxides include, but are not limited to titanium tetramethoxide $Ti(OCH_3)_4$ (also referred to as titanium methoxide), titanium tetraisopropoxide $Ti(OCH(CH_3)_2)_4$, titanium tetraethoxide $Ti(OC_2H_5)_4$, titanium butoxide $Ti(OC_4H_9)_4$ and chlorotriisopropoxytitanium(IV) $TiCl(OCH(CH_3)_2)_3$. In some embodiments, the titanium alkoxide is titanium butoxide.

In general, the alcohol having 1 to 5 carbon atoms may be any suitable alcohol having 1 to 5 carbon atoms. Examples of alcohols having 1 to 5 carbon atoms include, but are not limited to, methanol, ethanol, n-propanol, isopropanol, n-butanol, 2-butanol, isobutanol, tert-butanol, n-pentanol, 2-pentanol, 3-pentanol, 2-methyl-1-butanol, 3-methyl-1-butanol (isopentanol, isoamyl alcohol), 2-methyl-2-butanol (tert-amyl alcohol), 2-methyl-3-butanol, 2,2-dimethylpropanol, cyclopropanol, cyclobutanol, cyclopentanol, ethylene glycol, 1,3-propanediol, 1,2-propanediol, propane-2,2-diol, 1,4-butanediol, 1,3-butanediol, and 1,2-butanediol. In some embodiments, the alcohol having 1 to 5 carbon atoms has one or two hydroxyl groups (i.e., is a mono-alcohol or a diol). In some embodiments, the alcohol having 1 to 5 carbon atoms has one hydroxyl group. In some embodiments, the alcohol having 1 to 5 carbon atoms is ethanol.

In general, the organic acid may be any suitable organic acid known to one of ordinary skill in the art. Examples of organic acids include, but are not limited to citric acid, formic acid, acetic acid, oxalic acid, lactic acid, uric acid, malic acid, tartaric acid, butyric acid, folic acid, propionic acid, glycolic acid, malonic acid, succinic acid, benzoic acid, phthalic acid, isophthalic acid, terephthalic acid, and the like. In some embodiments, the organic acid is glacial acetic acid.

In general, the zinc ion source can be any suitable compound or complex that includes a zinc ion. Examples of suitable zinc ion sources include, but are not limited to zinc acetate ($Zn(C_2H_3O_2)_2$), zinc chloride ($ZnCl_2$), zinc bromide ($ZnBr_2$), zinc iodide ($ZnI_2$), zinc nitrate ($Zn(NO_3)_2$), zinc oxide (ZnO), zinc acetylacetonate ($Zn(acac)_2$), zinc cyanide ($Zn(CN)_2$), zinc citrate, zinc lactate, and zinc sulfate ($ZnSO_4$). In some embodiments, the zinc ion source is zinc nitrate $Zn(NO_3)_2$.

In general, the nickel ion source can be any suitable compound or complex that includes a nickel ion. Examples of suitable nickel ion sources include, but are not limited to nickel acetate (Ni(C$_2$H$_3$O$_2$)$_2$), nickel chloride (NiCl$_2$), nickel bromide (NiBr$_2$), nickel iodide (NiI$_2$), nickel nitrate (Ni(NO$_3$)$_2$), nickel acetylacetonate (Ni(acac)$_2$), nickel cyanide (Ni(CN)$_2$), nickel citrate, nickel lactate, nickel sulfate (NiSO$_4$) and nickel oxide (NiO). In some embodiments, the nickel ion source is nickel nitrate Ni(NO$_3$)$_2$.

In some embodiments, the molar ratio of zinc to nickel in the second solution is in the range of 1.5:1 to 1:1.5. For example, the molar ratio of zinc to nickel in the second solution may be 1.50:1, 1.45:1, 1.40:1, 1.35:1, 1.30:1, 1.25:1, 1.20:1, 1.15:1, 1.10:1, 1.05:1, 1.0:1.0, 1:1.05, 1:1.10, 1:1.15, 1:1.20, 1:1.25, 1:1.30, 1:1.35, 1:1.40, 1:1.45, or 1:1.50.

In some embodiments, the metal precursor solution has a molar ratio of titanium to a sum of a zinc and nickel in the range of 1.75:1 to 0.75:1. For example, the metal precursor solution has a molar ratio of titanium to a sum of a zinc and nickel of 1.75:1, 1.70:1, 1.65:1, 1.60:1, 1.55:1, 1.50:1, 1.45:1, 1.40:1, 1.35:1, 1.30:1, 1.25:1, 1.20:1, 1.15:1, 1.10:1, 1.05:1, 1.0:1, 0.95:1, 0.90:1, 0.85:1, 0.80:1, or 0.75:1.

At step 54, the method 50 includes adding a third solution comprising an amino acid to the metal precursor solution to form a reaction mixture. Suitable examples of amino acids include, but are not limited to, alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine. In some embodiments, the amino acid is arginine.

In some embodiments, the amino acid is present in an amount of 5 to 10 grams per liter (g/L) based on a total volume of reaction mixture. For example, the amino acid may be present in an amount of 5.0 g/L, 5.25 g/L, 5.5 g/L, 5.75 g/L, 6.0 g/L, 6.25 g/L, 6.5 g/L, 6.75 g/L, 7.0 g/L, 7.25 g/L, 7.5 g/L, 7.75 g/L, 8.0 g/L, 8.25 g/L, 8.5 g/L, 8.75 g/L, 9.0 g/L, 9.25 g/L, 9.5 g/L, 9.75 g/L, or 10.0 g/L based on a total volume of reaction mixture.

At step 56, the method includes heating the reaction mixture to 100 to 200° C. For example, the reaction mixture may be heated to 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or 200° C. In some embodiments, the reaction mixture is heated until dry to form an intermediate product. The reaction mixture may be heated under continuous stirring until the solvent is completely evaporated. In general, the heating can be performed by using any suitable heating appliance, such as ovens, microwaves, autoclaves, hot plates, heating mantles and tapes, oil baths, salt baths, sand baths, air baths, hot-tube furnaces, and hot-air guns.

At step 58, the method includes calcining the intermediate product at 600 to 800° C. to form the nanocomposite. The calcination of the powder may be carried out under a restricted supply of oxygen, such as in a sealed container or under an inert gas, or under an unrestricted supply of oxygen, such as in ambient atmosphere.

In some embodiments, the intermediate product is calcined at 600 to 800° C. For example, the product may be calcined at 600° C., 605° C., 610° C., 615° C., 620° C., 625° C., 630° C., 635° C., 640° C., 645° C., 650° C., 655° C., 660° C., 665° C., 670° C., 675° C., 680° C., 685° C., 690° C., 695° C., 700° C., 705° C., 710° C., 715° C., 720° C., 725° C., 730° C., 735° C., 740° C., 745° C., 750° C., 755° C., 760° C., 765° C., 770° C., 775° C., 780° C., 785° C., 790° C., 795° C., or 800° C. In some embodiments, the intermediate product may be calcined for 0.25 to 8 hours. For example, the intermediate product may be calcined for 0.25 hours, 0.5 hours, 0.75 hours, 1.0 hours, 1.25 hours, 1.5 hours, 1.75 hours, 2.0 hours, 2.25 hours, 2.5 hours, 2.75 hours, 3.0 hours, 3.25 hours, 3.5 hours, 3.75 hours, 4.0 hours, 4.25 hours, 4.5 hours, 4.75 hours, 5.0 hours, 5.25 hours, 5.5 hours, 5.75 hours, 6.0 hours, 6.25 hours, 6.5 hours, 6.75 hours, 7.0 hours, 7.25 hours, 7.5 hours, 7.75 hours, or 8.0 hours.

The present disclosure also relates to a method of photodegrading an organic pollutant using the nanocomposite. In some embodiments, the organic pollutant is at least one selected from the group consisting of a dye, a phenol, a polycyclic aromatic hydrocarbon, an herbicide, a pesticide, and a persistent organic pollutant.

In some embodiments, the organic pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurprin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound including of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphtacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazaic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane (α- and β-), hexabromodiphenyl ether, lindane, pentachlorobenzene, tetrabromodiphenyl ether, perfluorooctanesulfonic acid, endosulfans, and hexabromocyclododecane.

In some embodiments, the method includes irradiating with light and a photodegradation mixture including the organic pollutant, water, and the nanocomposite described above. Generally, the nanocomposite functions as a photocatalyst. In some embodiments, the photodegradation mixture may be irradiated using a source that includes, but is not limited to, the a UV lamps, an LED light source, a xenon arc lamp, a laser, a fluorescent lamp, and the like.

In some embodiments, the photocatalyst is present in the photodegradation mixture in an amount of 10 to 5000 milligrams photocatalyst per liter (mg/L) of photodegradation mixture. For example, the photocatalyst may be present in the photodegradation mixture in an amount of 10 mg/L, 25 mg/L, 50 mg/L, 75 mg/L, 100 mg/L, 125 mg/L, 150 mg/L, 175 mg/L, 200 mg/L, 225 mg/L, 250 mg/L, 275 mg/L, 300 mg/L, 325 mg/L, 350 mg/L, 375 mg/L, 400 mg/L, 425 mg/L, 450 mg/L, 475 mg/L, 500 mg/L, 550 mg/L, 600 mg/L, 650 mg/L, 700 mg/L, 750 mg/L, 800 mg/L, 850 mg/L, 900 mg/L, 950 mg/L, 1000 mg/L, 1250 mg/L, 1500 mg/L, 1750 mg/L, 2000 mg/L, 2250 mg/L, 2500 mg/L, 2750 mg/L, 3000 mg/L, 3250 mg/L, 3500 mg/L, 3750 mg/L, 4000 mg/L, 4250 mg/L, 4500 mg/L, 4750 mg/L, or 5000 mg/L.

In some embodiments, the organic pollutant is present in the photodegradation mixture in an amount of 0.01 to 10,000 parts per million (ppm). For example, the organic pollutant may be present in the photodegradation mixture in an amount of 0.01 ppm, 0.025 ppm, 0.05 ppm, 0.075 ppm, 0.1 ppm, 0.25 ppm, 0.5 ppm, 0.75 ppm, 1 ppm, 1.25 ppm, 1.5 ppm, 1.75 ppm, 2 ppm, 2.5 ppm, 3 ppm, 3.5 ppm, 4 ppm, 4.5 ppm, 5 ppm, 5.5 ppm, 6 ppm, 6.5 ppm, 7 ppm, 7.5 ppm, 8 ppm, 8.5 ppm, 9 ppm, 9.5 ppm, 10 ppm, 12.5 ppm, 15 ppm, 17.5 ppm, 20 ppm, 22.5 ppm, 25 ppm, 27.5 ppm, 30 ppm, 35 ppm, 40 ppm, 45 ppm, 50 ppm, 75 ppm, 100 ppm, 125 ppm, 150 ppm, 175 ppm, 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1250 ppm, 1500 ppm, 1750 ppm, 2000 ppm, 2250 ppm, 2500 ppm, 2750 ppm, 3000 ppm, 3250 ppm, 3500 ppm, 3750 ppm, 4000 ppm, 4250 ppm, 4500 ppm, 4750 ppm, 5000 ppm, 5250 ppm, 5500 ppm, 5750 ppm, 6000 ppm, 6250 ppm, 6500 ppm, 6750 ppm, 7000 ppm, 7250 ppm, 7500 ppm, 7750 ppm, 8000 ppm, 8250 ppm, 8500 ppm, 8750 ppm, 9000 ppm, 9250 ppm, 9500 ppm, 9750 ppm, or 10,000 ppm.

In some embodiments, the method degrades 70 to 99%, preferably 75-98%, preferably 77-96%, preferably 80-95%, preferably 85-90% and preferably 88-89% of an initial amount of organic pollutant in a reaction time of 180 minutes.

EXAMPLES

The following examples demonstrate a nanocomposite as described herein. The examples are provided solely for illustration and are not to be construed as limitations of the present disclosure, as many variations thereof are possible without departing from the spirit and scope of the present disclosure.

Figure 2:
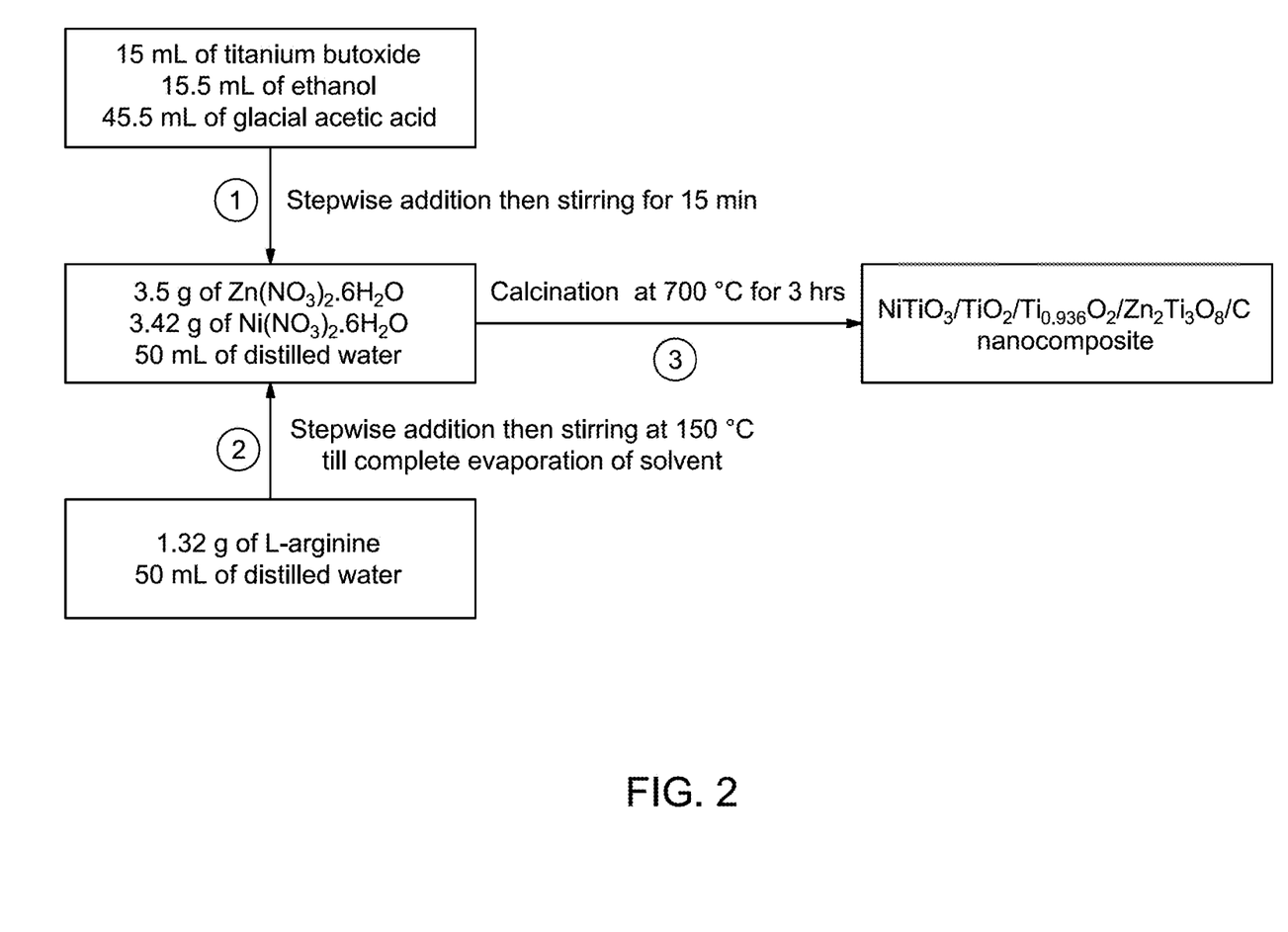
FIG. 2 is an experimental step for the production of $NiTiO_3/TiO_2/Ti_{0.936}O_2/Zn_2Ti_3O_8/C$ nanocomposite, according to certain embodiments.

Example 1: Synthesis of $NiTiO_3/TiO_2/Ti_{0.936}O_2/Zn_2Ti_3O_8/C$ Nanocomposite Using Sol-Gel/Combustion Method The synthesis of $NiTiO_3/TiO_2/Ti_{0.936}O_2/Zn_2Ti_3O_8/C$ nanocomposite was carried out through a sol-gel/combustion method, as illustrated in FIG. 2. Initially, 15 mL of titanium butoxide was dissolved in a mixture of 15.5 mL ethanol and 45.5 mL glacial acetic acid. Separately, 3.5 g of $Zn(NO_3)_2 \cdot 6H_2O$ and 3.42 g of $Ni(NO_3)_2 \cdot 6H_2O$ were dissolved in 50 mL of distilled water. The resulting solution was added stepwise to the titanium precursor under continuous stirring for 15 min. Subsequently, 1.32 g of L-arginine was dissolved in 50 mL of distilled water, and the solution was added stepwise to the previously obtained mixture under continuous stirring at 150° C. until the solvent was completely evaporated. The resulting powder was calcinated at 700° C. for 3 hrs to produce the $NiTiO_3/TiO_2/Ti_{0.936}O_2/Zn_2Ti_3O_8/C$ nanocomposite.

Example 2: X-Ray Characterization

Figure 3:
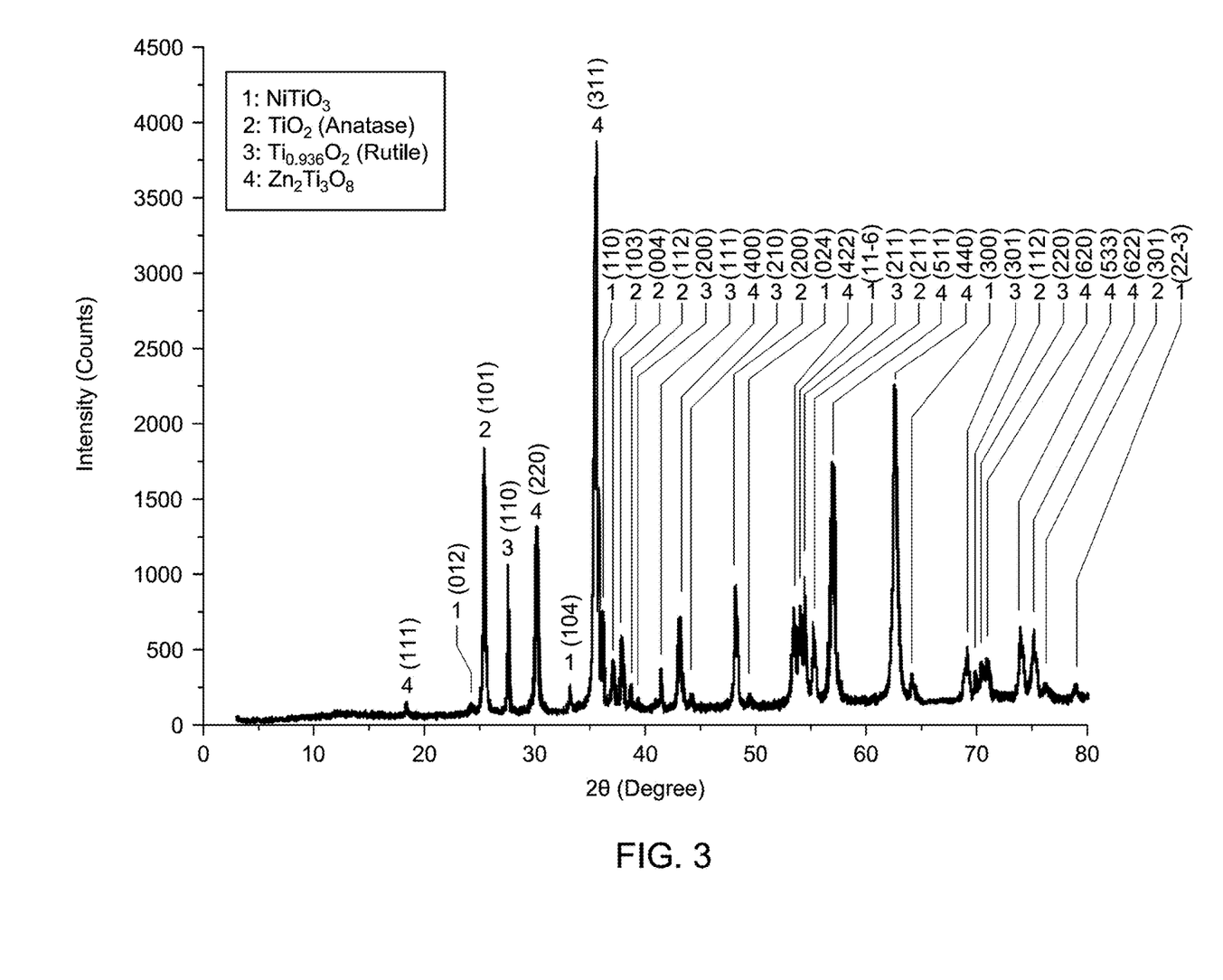
FIG. 3 depicts an X-ray diffraction (XRD) pattern of the synthesized nanocomposite, according to certain embodiments.

The X-ray diffraction (XRD) pattern of the synthesized nanocomposite is shown in FIG. 3, and the structural and crystallographic properties of its components are summarized in Table 1. The synthesized nanocomposite includes four phases: rhombohedral nickel titanate ($NiTiO_3$), identified using JCPDS card No. 01-083-0198; tetragonal titanium oxide (anatase $TiO_2$), identified using JCPDS card No. 01-089-4921; tetragonal titanium oxide (rutile $Ti_{0.936}O_2$), identified using JCPDS card No. 01-089-0554; and cubic dizinc trititanium octaoxide ($Zn_2Ti_3O_8$), identified using JCPDS card No. 01-073-0579. For rhombohedral $NiTiO_3$, the characteristic 2θ angles are 24.24, 33.16, 35.99, 49.41, 53.94, 64.11, and 78.79, corresponding to the Miller indices (012), (104), (110), (024), (11-6), (300), and (22-3), respectively. The anatase phase of tetragonal $TiO_2$ exhibits 2θ angles of 25.39, 37.03, 37.88, 38.61, 48.15, 55.19, 70.41, and 76.08, corresponding to the Miller indices (101), (103), (004), (112), (200), (211), (220), and (301), respectively. The rutile phase of tetragonal $Ti_{0.936}O_2$ shows 2θ angles of 27.49, 39.23, 41.33, 44.07, 54.35, 69.04, and 69.88, with the Miller indices (110), (200), (111), (210), (211), (301), and (112), respectively. For cubic $Zn_2Ti_3O_8$, the 2θ angles are 18.26, 30.11, 35.46, 43.12, 53.41, 56.87, 62.53, 70.83, 73.98, and 75.13, corresponding to the Miller indices (111), (220), (311), (400), (422), (511), (440), (620), (533), and (622), respectively. The synthesized nanocomposite exhibits an average crystallite size of 61.31 nanometer (nm), reflecting its nanoscale dimensions and crystallinity.

TABLE 1

Structural and crystallographic properties of the synthesized nanocomposite components

| Components of synthesized nanocomposite | | | | Average crystallite size of synthesized nano-composite (nm) |
|---|---|---|---|---|
| Phase | Chemical name | Card No. | Crystal system | |
| $NiTiO_3$ | Nickel titanate | JCPDS-01-083-0198 | Rhombohedral | 61.31 |
| $TiO_2$ | Titanium oxide (Anatase) | JCPDS-01-089-4921 | Tetragonal | |
| $Ti_{0.936}O_2$ | Titanium oxide (Rutile) | JCPDS-01-089-0554 | Tetragonal | |
| $Zn_2Ti_3O_8$ | Dizinc trititanium octaoxide | JCPDS-01-073-0579 | Cubic | |

Example 3. Compositional Analysis

Figure 4:
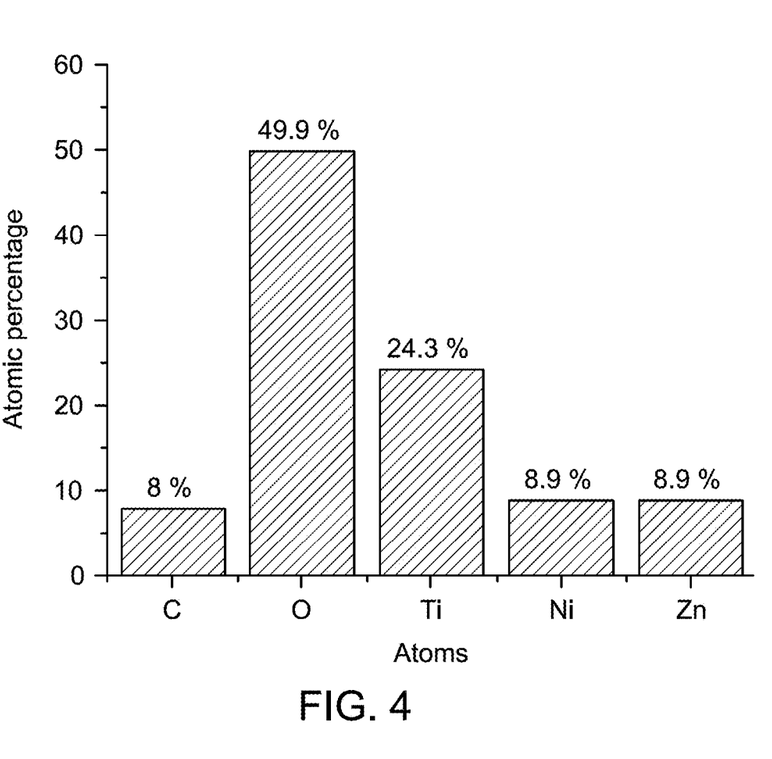
FIG. 4 depicts a distribution of atomic percentages of elements in the synthesized nanocomposite as determined by energy dispersive X-ray spectroscopy (EDX), according to certain embodiments.

FIG. 4 illustrates the atomic percentage distribution of elements in the synthesized nanocomposite as determined by energy dispersive X-ray spectroscopy (EDX). The elemental composition reveals that oxygen is the most abundant element with an atomic percentage of 49.9%, followed by titanium at 24.3%, while nickel and zinc each contribute 8.9%, and carbon accounts for 8%. The elemental analysis confirms the stoichiometric presence of the constituent elements, indicating successful synthesis and homogeneity of the nanocomposite.

Example 4. Electron Microscopy

Figure 5:
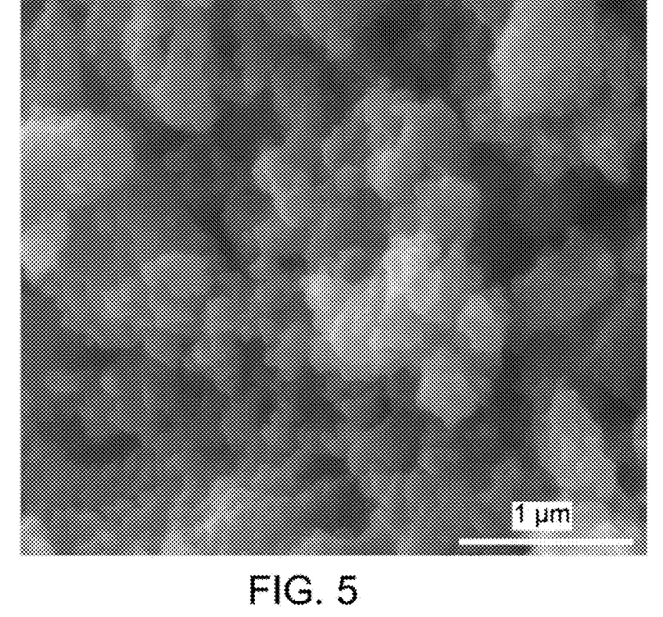
FIG. 5 depicts a scanning electron microscope (SEM) image of the synthesized nanocomposite with a magnification of 1 micrometer (μm), according to certain embodiments.

FIG. 5 shows the scanning electron microscope (SEM) image of the synthesized nanocomposite, showcasing its surface morphology and microstructural features. The SEM image reveals agglomerated nanoparticles with irregular shapes, including spherical-like and flake-like morphologies, distributed uniformly across the sample. The high magnification provides insight into the nanoscale texture and confirms the nanostructured nature of the composite material, highlighting the successful synthesis process and the structural homogeneity of the product.

Figure 6:
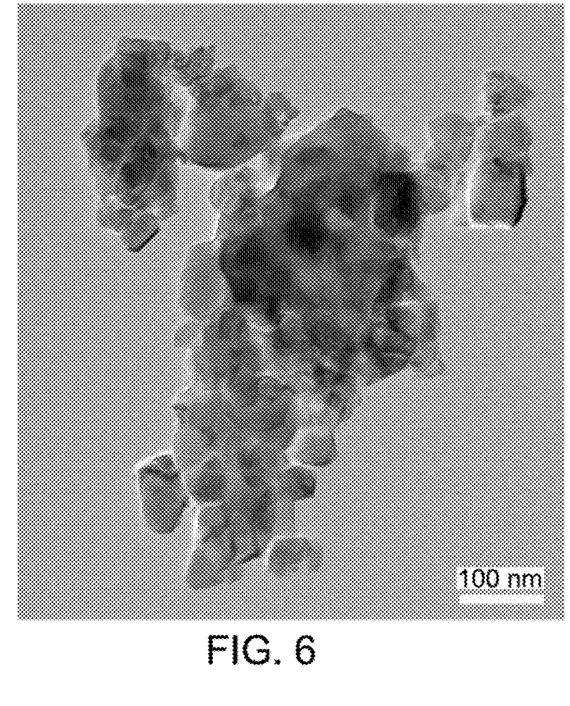
FIG. 6 depicts a high-resolution transmission electron microscope (HRTEM) image of synthesized nanocomposite with a magnification of 100 nanometer (nm), according to certain embodiments.

FIG. 6 displays the high-resolution transmission electron microscope (HRTEM) image of the synthesized nanocomposite, providing detailed insights into its nano structural characteristics. The image reveals that the particles exhibit irregular shapes, including spherical and polygonal morphologies, with a uniform distribution and close contact between them. The nanocomposite demonstrates a nanoscale architecture with an average particle diameter of 54.74 nm, indicating the successful synthesis of fine nanoparticles. The high resolution of the image highlights the structural integrity and uniformity of the synthesized nanocomposite, confirming its suitability for advanced applications.

The synthesized $NiTiO_3/TiO_2/Ti_{0.936}O_2/Zn_2Ti_3O_8/C$ nanocomposite may be useful in environmental remediation as an efficient adsorbent for removing heavy metal ions and organic pollutants from wastewater. The nanocomposite may be useful in water purification systems and industrial effluent treatment plants.

Numerous modifications and variations of the present disclosure are possible in light of the above teachings. It is therefore to be understood that within the scope of the appended claims, the invention may be practiced otherwise than as specifically described herein.

The invention claimed is:

1. A $NiTiO_3/TiO_2/Ti_{0.936}O_2/Zn_2Ti_3O_8/C$ nanocomposite, comprising
   a nickel titanate;
   titanium dioxide comprising anatase $TiO_2$ and rutile $Ti_{0.936}O_2$;
   a zinc titanate; and
   carbon;
   wherein the nanocomposite comprises 20 to 40 atom % titanium, 5 to 15 atom % nickel, and 5 to 15 atom % zinc, each based on a total number of atoms in the nanocomposite.

2. The $NiTiO_3/TiO_2/Ti_{0.936}O_2/Zn_2Ti_3O_8/C$ nanocomposite of claim 1, wherein the nickel titanate is rhombohedral $NiTiO_3$.

3. The $NiTiO_3/TiO_2/Ti_{0.936}O_2/Zn_2Ti_3O_8/C$ nanocomposite of claim 1, wherein the zinc titanate is cubic $Zn_2Ti_3O_8$.

4. The $NiTiO_3/TiO_2/Ti_{0.936}O_2/Zn_2Ti_3O_8/C$ nanocomposite of claim 1, wherein the carbon is present as a carbon nanomaterial which is at least one selected from the group consisting of carbon nanotubes, carbon nanobuds, carbon nanoscrolls, carbon dots, activated carbon, carbon black, graphene, graphene oxide, reduced graphene oxide, and nanodiamonds.

5. The $NiTiO_3/TiO_2/Ti_{0.936}O_2/Zn_2Ti_3O_8/C$ nanocomposite of claim 1, wherein the nanocomposite comprises
   40 to 60 atom % oxygen, and
   4 to 12 atom % carbon, each based on a total number of atoms in the nanocomposite.

6. The $NiTiO_3/TiO_2/Ti_{0.936}O_2/Zn_2Ti_3O_8/C$ nanocomposite of claim 1, wherein the nanocomposite has
   a mean particle size of 25 to 75 nm by TEM; and
   a mean crystallite size of 30 to 85 nm by XRD, the mean crystallite size being larger than the mean particle size.

7. A method of forming the $NiTiO_3/TiO_2/Ti_{0.936}O_2/Zn_2Ti_3O_8/C$ nanocomposite of claim 1, the method comprising
   mixing a first solution comprising a titanium alkoxide, an alcohol having 1 to 5 carbon atoms, and an organic acid with a second solution comprising a zinc ion source and a nickel ion source to form a metal precursor solution;
   adding a third solution comprising an amino acid to the metal precursor solution to form a reaction mixture;
   heating the reaction mixture to 100 to 200° C. until dry to form an intermediate product; and
   calcining the intermediate product at 600 to 800° C. to form the $NiTiO_3/TiO_2/Ti_{0.936}O_2/Zn_2Ti_3O_8/C$ nanocomposite.

8. The method of claim 7, wherein the titanium alkoxide is titanium butoxide.

9. The method of claim 7, wherein the alcohol having 1 to 5 carbon atoms is ethanol.

10. The method of claim 7, wherein the organic acid is glacial acetic acid.

11. The method of claim 7, wherein the zinc ion source is zinc nitrate.

12. The method of claim 7, wherein the nickel ion source is nickel nitrate.

13. The method of claim 7, wherein the amino acid is arginine.

14. The method of claim 7, wherein the second solution has a mole ratio of zinc to nickel of 1.5:1 to 1:1.5.

15. The method of claim 7, wherein the metal precursor solution has a mole ratio of titanium to a sum of a zinc and nickel of 1.75:1 to 0.75:1.

16. The method of claim 7, wherein the amino acid is present in an amount of 5 to 10 g/L based on a total volume of reaction mixture.

17. A method of photodegrading an organic pollutant, the method comprising:
   irradiating with light a photodegradation mixture comprising
   the organic pollutant,
   water, and
   the $NiTiO_3/TiO_2/Ti_{0.936}O_2/Zn_2Ti_3O_8/C$ nanocomposite of claim 1,
   wherein the organic pollutant is at least one selected from the group consisting of a dye, a phenol, a polycyclic aromatic hydrocarbon, an herbicide, a pesticide, and a persistent organic pollutant.

18. The method of claim 17, wherein the photocatalyst is present in the photodegradation mixture in an amount of 10 to 5000 mg photocatalyst per L of photodegradation mixture.

19. The method of claim 17, wherein the organic pollutant is present in the photodegradation mixture in an amount of 0.01 to 10,000 ppm.

20. The method of claim 17, wherein the method degrades 70 to 99% of an initial amount of organic pollutant in a reaction time of 180 minutes.

* * * * *